United States Patent
Suzuki et al.

(10) Patent No.: US 6,245,313 B1
(45) Date of Patent: Jun. 12, 2001

(54) PROCESS FOR MANUFACTURING A PRODUCT OF GLASSY CARBON

(75) Inventors: Kunihiko Suzuki, Sunto-gun; Takaaki Honda, Mishima; Shinichi Mitani, Numazu; Tadashi Ohashi; Shuji Tobashi, both of Sagamihara, all of (JP)

(73) Assignees: Toshiba Machine Co., Ltd.; Toshiba Ceramics Co., Ltd., both of Tokyo (JP)

( * ) Notice: Subject to any disclaimer, the term of this patent is extended or adjusted under 35 U.S.C. 154(b) by 0 days.

(21) Appl. No.: 09/312,695

(22) Filed: May 17, 1999

(30) Foreign Application Priority Data

May 19, 1998 (JP) .................................. 10-136673

(51) Int. Cl.⁷ .................................. C01B 31/02
(52) U.S. Cl. ...................... 423/445 R; 423/460
(58) Field of Search .................. 427/228; 423/445 R, 423/460

(56) References Cited

U.S. PATENT DOCUMENTS 3,632,385 * 1/1972 Schmitt et al. ................ 427/228
3,927,186 * 12/1975 Vinton et al. ................ 427/227

FOREIGN PATENT DOCUMENTS

| 45-11004 | 4/1970 | (JP) . |
| 2-173269 | 7/1990 | (JP) . |
| 7-22385 | 1/1995 | (JP) . |

* cited by examiner

Primary Examiner—Stuart L. Hendrickson
(74) Attorney, Agent, or Firm—Pillsbury Winthrop LLP

(57) ABSTRACT

The object of the present invention is to provide a process for manufacturing a product of glassy carbon, having endurance strength to fatigue at elevated temperature, and to thermal fatigue. After curing the material resin in a mold, the cured resin is baked to obtain a glassy carbon piece. The piece is then machined into a predetermined shape. Subsequently, the surface of the piece resulted after machining, is impregnated with the resin. Further, the resin-impregnated piece is baked so as to transform the impregnated resin into glassy carbon.

5 Claims, 1 Drawing Sheet

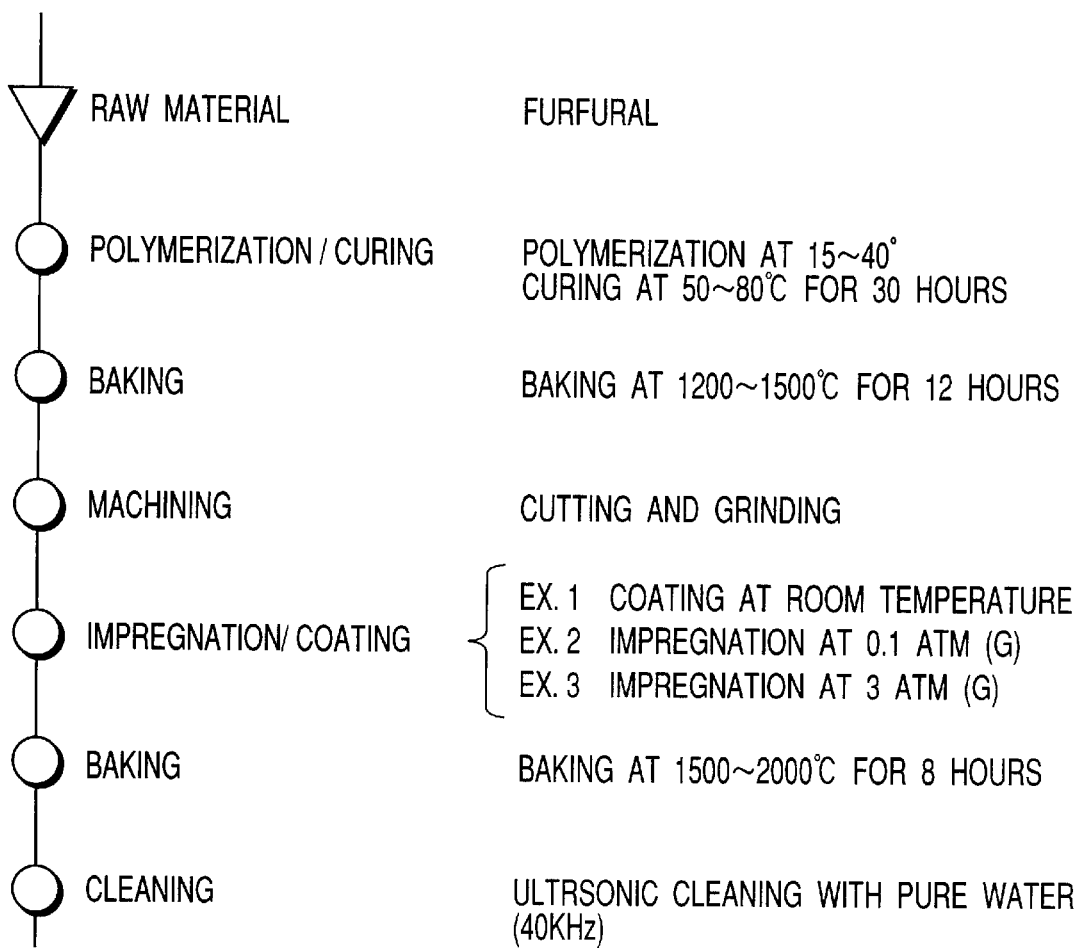
FIGURE

PROCESS FOR MANUFACTURING A PRODUCT OF GLASSY CARBON

BACKGROUND OF THE INVENTION

The present invention relates to a process for manufacturing a product of glassy carbon, and more specifically to a method of manufacturing a structural member of glassy carbon used in a semiconductor manufacturing apparatus under elevated temperature of 500° C. or higher.

Structural members made of glassy carbon are excellent in chemical stability and mechanical strength, and therefore they are used in portions of, for example, a semiconductor manufacturing apparatus, which are exposed to high temperature and require high mechanical strength.

The conventional process for manufacturing a structural member of glassy carbon will now be briefly described. First, a raw material resin is polymerized in a mold, and cured, thus obtaining a semi-processed piece having a predetermined shape. Then, the piece is baked. The baked piece is subjected to machining and grinding, and thus a product of a final shape is obtained. The obtained product is subjected to ultrasonic cleaning in pure water, and lastly, it is inspected of dimensions, shape and surface defection.

In the conventional manufacturing process, as described above, after baking of the molded piece, machining process is carried out to obtain a product to have a final shape. However, during the machining process, fine cracks or scratches (to be called as micro-cracks hereinafter) may be created.

When cyclic stress is applied at elevated temperature onto to such a glassy carbon material, or when thermal stress by exposure to temperature changes is applied thereto, micro cracks grow to become fatigue cracks. As a result, the glassy carbon product is broken after relatively short time.

BRIEF SUMMARY OF THE INVENTION

The present invention has been proposed in consideration of the drawbacks of the glassy carbon product manufactured by the conventional manufacturing process, and the object thereof is to provide a process for manufacturing a product of glassy carbon having an endurance strength to fatigue at elevated temperature, and to thermal fatigue.

Therefore, according to the present invention, there is provided a process for manufacturing a product of glassy carbon, which includes the steps of:

preparing a piece made of glassy carbon by curing a raw material resin in a mold and baking the cured resin;

machining the piece into a predetermined shape;

impregnating the raw material resin into a surface of the piece machined; and transforming the resin into glassy carbon by baking the piece to which the resin has been impregnated.

According to the present invention, the resin is impregnated to the surface of the piece which has been machined, and then the resultant piece is baked. Thus, micro-cracks created on the surface of the piece are filled with the resin, and therefore it becomes possible to obtain a glassy carbon product having less surface defects. Consequently, the fatigue strength at elevated temperature and thermal fatigue strength of the glassy carbon product can be improved.

It should be noted that as the resin, a material prepared by polymerizing furan-based material such as furfural or imide-based material can be used.

The impregnation of the resin into the surface of the piece after the machining process can be carried out by coating, or dip coating carried out under a reduced pressure atmosphere or high pressure atmosphere.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE is a flowchart of steps which illustrates an example of the process for manufacturing a product of glassy carbon, according to the present invention.

DETAILED DESCRIPTION OF THE INVENTION

On the basis of the process for manufacturing a product of glass carbon, according to the present invention, a disk-shaped part used as a susceptor for supporting a silicon wafer in a chemical vapor deposition system, was manufactured in the following manner. FIGURE shows a flow of the manufacturing steps.

(Embodiment 1)

Furfural, which is a material having a furan ring, is stirred at 30° C., and polymerized. Then, the resultant is retained in a mold at 72° C. for 30 hours, and thus a disk (diameter of 375 mm and thickness of 4 mm) having a size larger than that of the final product was prepared. Thus obtained disk was baked at 1300° C. for 12 hours, thus obtaining a semi-processed piece. The piece was subjected to machining and grinding, so as to finish it into a disk of the final shape having a diameter of 360 mm and thickness of 3 mm.

Next, the surface of the disk was coated with furfural polymer solution so as to impregnate the solution into the surface, and then the excessive solution was removed. Then, the resultant was baked at 1700° C. for 8 hours. After that, the baked resultant was cleaned in pure water using ultrasonic wave of 4 kHz. Further, the resultant was inspected of dimensions, shape and surface defect. Thus, a disk-shaped structural member made of glassy carbon was completed.

(Embodiment 2)

In place of the coating of the furfural polymer solution on the disk after the machining process in Embodiment 1, the machined disk is immersed into furfural polymer solution in an atmosphere at room temperature and pressure of 0.1 atm (G), so as to impregnate the furfural polymer solution into the surface of the disk. The other conditions are the same as those of Embodiment 1.

(Embodiment 3)

In place of the coating of the furfural polymer solution on the disk after the machining process in Embodiment 1, the machined disk is immersed into a furfural polymer solution in an atmosphere at room temperature and pressure of 3 atm (G), so as to impregnate the furfural polymer solution into the surface of the disk. The other conditions are the same as those of Embodiment 1.

The glassy carbon products manufactured by the method described in the above Embodiments 1 to 3 were subjected to thermal cycles which is repeated for 100 times between room temperature and 1000° C., and the change in bending strength before and after the thermal cycles was measured. The results were summarized in TABLE 1. It should be noted that FIGURE also includes as a comparison the results of the same test carried out on a glassy carbon product manufactured by the conventional method.

TABLE 1

|  | Method of Impregnation | Initial strength | Strength after subjected to thermal cycles |
|---|---|---|---|
| Embodiment 1 | Coating | 38.4 | 34.6 |
| Embodiment 2 | Immersion under reduced pressure | 51.3 | 47.1 |
| Embodiment 3 | Immersion under high pressure | 46.7 | 40.3 |
| Conventional method |  | 20.0 | 11.2 |

TABLE 1 Comparison in Bending Strength (kgf/mm$^2$)

Of Embodiments 1 to 3, the product manufactured by the process for Embodiment 1, exhibited the lowest bending strength. The actual values of this product measured before and after subjected to the thermal cycles are 38.4 kgf/mm$^2$ and 34.6 kgf/mm$^2$, respectively. By contrast, the values of the product manufactured by the conventional method are 20.0 kgf/mm$^2$ and 11.2 kgf/mm$^2$, respectively. As can be understood from the results, before subjected to the thermal cycles, the products manufactured by the present invention method have bending strengths higher than about twice as that of the conventional case. Further, after subjected to the thermal cycles, the products of the present invention exhibited a small rate of decrease in bending strength, whereas the bending strength of the conventional product decreased close to a half.

Next, the heating and cooling cycle operation is repeated between temperatures of 500° C. and 1200° C., the number of thermal cycles before the breakage of the product (that is, the life of the product) was examined. The results indicated that the product manufactured by the process for Embodiment 1 broke down after 1600 cycles. By contrast, the conventional product broke down after 130 cycles. To summarize, it was confirmed that the products manufactured by the process for the present invention have a thermal fatigue life of about 12 times higher than that of the conventional product.

According to the process for manufacturing a product of glassy carbon, according to the present invention, a semi-processed piece of glassy carbon is machined, and then the raw material resin is impregnated into the surface of the piece, followed by baking. With these operations, microcracks of the surface of the piece, which are created during the machining process, are filled, and thus a glassy carbon product with less surface defects can be obtained. Therefore, the fatigue strength at elevated temperature and thermal fatigue strength of the glassy carbon product can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process for manufacturing a product of glassy carbon, the process comprising:

preparing a piece made of glassy carbon, said preparing comprising curing an initial amount of a raw material resin in a mold and baking the cured resin;

machining the piece made of glassy carbon into a predetermined shape;

impregnating an additional amount of the raw material resin into a surface of the machined piece made of glassy carbon; and transforming the additional amount of the raw material resin into glassy carbon by baking the machined piece made of glassy carbon and into which the additional amount of the raw material resin has been impregnated.

2. A process for manufacturing a product of glassy carbon according to claim 1, wherein the raw material resin is prepared by polymerizing a furan-based resin or an imide-based resin.

3. A process for manufacturing a product of glassy carbon according to claim 1 or 2, wherein the additional amount of the raw material resin is impregnated into the surface of the machined piece made of glassy carbon by coating the machined piece made of glassy carbon with the raw material resin.

4. A process for manufacturing a product of glassy carbon according to claim 1 or 2, wherein the additional amount of the raw material resin is impregnated into the surface of the machined piece made of glassy carbon by immersing the machined piece made of glassy carbon into the raw material resin under a reduced pressure atmosphere.

5. A process for manufacturing a product of glassy carbon according to claim 1 or 2, wherein the additional amount of the raw material resin is impregnated into the surface of the machined piece made of glassy carbon by immersing the machined piece made of glassy carbon into the raw material resin under a raised pressure atmosphere.

* * * * *